(12) United States Patent
Stadtler et al.

(10) Patent No.: US 12,347,909 B2
(45) Date of Patent: Jul. 1, 2025

(54) GASEOUS FUEL STORAGE SYSTEM FOR VEHICLES

(71) Applicant: FORD GLOBAL TECHNOLOGIES, LLC, Dearborn, MI (US)

(72) Inventors: Arnold Stadtler, Cologne (DE); Ralf Schmierer, Cologne (DE); Frank P Gerhorst, Cologne (DE); Kathrin Lena Maria Giefer, Langenfeld (DE); Seonhi Ro, Börssum (DE); Christian Leiteritz, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 514 days.

(21) Appl. No.: 17/959,404

(22) Filed: Oct. 4, 2022

(65) Prior Publication Data

US 2023/0112178 A1   Apr. 13, 2023

(30) Foreign Application Priority Data

Oct. 8, 2021 (DE) .......................... 102021126153.8

(51) Int. Cl.
*H01M 8/22* (2006.01)
*B01J 20/22* (2006.01)
*H01M 8/04089* (2016.01)

(52) U.S. Cl.
CPC ............ *H01M 8/22* (2013.01); *B01J 20/226* (2013.01); *H01M 8/04104* (2013.01)

(58) Field of Classification Search
CPC ..... H01M 8/22; H01M 8/04104; B01J 20/226
See application file for complete search history.

(56) References Cited

U.S. PATENT DOCUMENTS

| | | | |
|---|---|---|---|
| 4,523,548 A | 6/1985 | Engel et al. | |
| 4,566,281 A | 1/1986 | Sandrock et al. | |
| 8,426,624 B2 | 4/2013 | Hupp et al. | |
| 10,702,851 B2 | 7/2020 | Ohashi | |
| 2008/0044704 A1 | 2/2008 | Kubo et al. | |
| 2014/0213832 A1 | 7/2014 | Gaab et al. | |

OTHER PUBLICATIONS

Haldar, Sandip et al. A First Principles Study Of Hydrogen Storage In Lithium Decorated Defective Phosphorene. International Journal of Hydrogen Energy 42 (2017). Aug. 10, 2017. 10 pages.

(Continued)

*Primary Examiner* — Sarah A. Slifka
(74) *Attorney, Agent, or Firm* — Brooks Kushman PC; David B. Kelley

(57) ABSTRACT

A storage system for reversibly storing and releasing a gas such as hydrogen includes storage elements each having a storage volume with a storage material such as a metal-organic framework (MOF) for reversibly adsorbing or physiosorbing the gas, a gastight housing surrounding the storage volume and having a gas inlet/outlet which is in fluid-conducting communication with the storage volume, and at least one non-fluid activating element or activating layer configured to, when in an activation state, release the gas stored in the MOF and/or increases the rate of release relative to an unactivated state. The activating element or layer may surround and/or penetrate the storage material. The activating element may be controlled by an associated control to enter the activation state.

20 Claims, 3 Drawing Sheets

(56) References Cited

OTHER PUBLICATIONS

Wijayanta, Agung Tri et al. Liquid Hydrogen, Methylcyclohexane, And Ammonia As Potential Hydrogen Storage: Comparison Review. International Journal of Hydrogen Energy 44 (2019). May 10, 2019. 19 pages.
German Search Report for German Application No. DE 10 2021 126 153.8, Completed by the European Patent Office, Dated Jun. 30, 2022, 7 pages.

GASEOUS FUEL STORAGE SYSTEM FOR VEHICLES

CROSS-REFERENCE TO RELATED APPLICATIONS

This application claims foreign priority benefits under 35 U.S.C. § 119(a)-(d) to DE Application 10 2021 126 153.8 filed Oct. 8, 2021, which is hereby incorporated by reference in its entirety.

TECHNICAL FIELD

Storage systems of motor vehicles that reversibly store and release a gas, such as hydrogen, used for operating the propulsion device of the vehicle.

BACKGROUND

For the storage of hydrogen, it is known practice to provide high-pressure tanks as storage elements, in which the hydrogen is stored at very high pressures, such as ≥500 bar, in order to provide sufficient fuel with one filling for the desired range of the vehicle. The provision of a high-pressure hydrogen tank of this kind, however, is very complicated, since the tank is required to withstand the high operating pressure under various operating conditions. Such high-pressure stores have a very large construction volume, meaning that a space-saving disposition in a vehicle is often not possible and, for example, other operating spaces such as a trunk compartment must be made correspondingly smaller. Furthermore, such stores often require cooling to be able to store hydrogen in the liquefied state, and this requires very complex construction and additional energy.

Storage systems have therefore been proposed for storing gases such as hydrogen in a storage material to reduce the operating pressure of the storage system and the cooling demand while storing comparatively high amounts of the gas for long vehicle ranges, examples of such systems being metal hydride storage systems or storage systems based on metal-organic framework (MOF) structures. Such MOF materials are described for example in U.S. Pat. No. 8,426,624 and US 2014/0213832 A1 and also in EP 3 381 924 B1. The use of these storage materials, though, has the disadvantage that release is slower relative to the use of liquefied gases such as hydrogen. The storage system is therefore in general unable to respond rapidly to changing vehicle operating conditions—if, for example, a relatively large amount of operating gas such as hydrogen must be provided in a short time to provide desired performance under various operating conditions.

There is a requirement, furthermore, for a generic storage system to be used in the case as well of apparatuses, such as motor vehicles, where existing operating means of the apparatus, such as the motor vehicle, have to be switched over from internal combustion engines such as gasoline and diesel engines to alternative propulsion designs such as the operation of the apparatus with electric motors, especially in combination with fuel cells. The installation of large-volume tanks into an apparatus such as a motor vehicle, for example, often requires complex structural changes, however, in the interior of the apparatus to be able to integrate such a storage system—for example, it often requires alteration to the construction of the interior of a motor vehicle.

It is often a requirement imposed on the storage system, furthermore, that after partial discharge or complete discharge, the system can be rapidly refilled with the stored gas, more particularly to maximum gas storage quantity.

SUMMARY

In accordance with one or more embodiments of the disclosure, the storage system has an activating element or activating layer of a nonfluid material, configured in such a way that in its activation state the storage element, more particularly the storage material, releases the gas stored in it and/or releases it to an increased extent in relation to an inactivated state, where the activating element or the activating layer at least partly surrounds and/or penetrates the storage material. The increased release may in particular be a release of the gas from the storage element and/or from the storage material, when a consumer connected to the storage system requires—for example, transfers—gas from the storage system. Said release of the stored gas therefore takes place through the activation of the activating element or activating layer. The activating element or activating layer may be configured in such a way that it can be converted into a plurality of activation states with different degrees of activation. With higher activation of the activating element or activating layer there is greater release of the stored gas.

The activating element or activating layer may be produced by 3D printing, allowing it to be adapted in its design and function with particular precision and with respect to the geometry, where appropriate, even of small storage or housing volumes.

The activating element may be configured as an activating layer, which may provide an increased rate of release of the gas. The activating layer may by virtue of its superficial extent provide particularly effective activation of the storage element or storage material by way of the superficial or volume-based extent thereof. The activating layer may activate the entire volume of the storage material of a storage element for increased rate of release of the stored gas. As used in this disclosure, reference to an activating layer also generally relate to an activating element. The at least one activating element or activating layer may be configured to activate the entire volume of the storage material of a storage element. It will be appreciated that the respective storage element may also comprise multiple activating elements.

It is optionally possible, alternatively or additionally, for the increased release of the stored gas from the storage element by means of the activating element to also lead to increased gas pressure of stored gas in the storage element and/or to reduction of the gas content in the storage element when the latter is emptied of residues.

By virtue of the activating element or activating layer, the release rate of the gas stored in the storage material can be substantially increased, specifically by activation of the activating layer. In this way it is possible within a relatively short time to release relatively large amounts of stored gas from the storage element and to supply the gas released to a consumer, when the gas is required by the consumer, for example. The consumer is able as a result to change its operating state in a substantially shorter time, in comparison with a storage system without such an activating layer. The consumer may constitute or comprise a fuel cell, which for its operation uses the gas released from the storage system, such as hydrogen in particular. The fuel cell may in this case generate the power needed to operate an electric motor. By virtue of the storage system of the invention, therefore, the consumer is able to respond particularly rapidly to changes in load, including more particularly increases in load, for example. The consumer may therefore generally also comprise or constitute a combination of a fuel cell with an electric motor supplied with power by said cell, more particularly an electric motor for propelling a motor vehicle. The consumer may optionally also convert the gas into propulsive energy for the apparatus directly, such as by direct combustion of the gas in an internal combustion engine, for example. Generally, in the context of the disclosure, the consumer is configured as a fuel cell.

In various embodiments, the activating layer surrounds the storage material in shell form. In this case the activating layer may be configured as a layer which is continuous in its superficial extent. The activating layer in shell form may surround the storage material at its surface, at least substantially over its entire outer surface, except for at least one or exactly one interruption in the activating layer. The interruption may be in fluid-conducting communication with the storage material and with this interruption on the other hand being in fluid-conducting communication with a gas inlet/outlet of the storage element to be able to take off gas released through the interruption in the storage element and/or to supply gas to the storage material on loading of the storage element. Generally in the context of the disclosure, the gas inlet/outlet of the storage element is in fluid-conducting communication with a consumer via a line. Through the fluid-conducting line, the gas may also be supplied to the storage material from an external supply source, such as a gas or hydrogen filling station, and be stored by the storage material or, on release of the gas from the storage material, supplied to the consumer. By virtue of the activating layer in shell form that surrounds the storage material, the storage material can be subjected to large-volume activation with uniform activation over the longitudinal and/or latitudinal extent of the storage element and/or over the cross section of the storage material region in the storage element in each case over at least substantially the entire longitudinal and/or latitudinal extent and/or over the entire cross section of the storage material region. As a result of the uniform activation of the storage material in different or in all the volume elements of said material, the storage element has a relatively low response time for the release of the stored gas. Furthermore, the storage element with activating layer disposed in shell form is particularly simple to produce. Following provision of an accumulation of material or of a coherent body of the storage material, the activating layer can be disposed around the storage material in one operating step or in a few operating steps, in order to produce the storage element. Alternatively or additionally, the activating layer may also at least partly or completely penetrate the storage material, in which case the activating layer may be configured in ply form, in ribbon form, in hose form, in rod form, or in another suitable way. The activating medium layer may optionally also be constructed of a plurality of activating regions, which are small in area or substantially in point form and which are connected to one another with elements that transmit an activating signal. It will be appreciated that the respective activating regions or activating elements may also be embedded in a matrix of a suitable material, and form the respective activating layer together with the matrix material.

In the housing, the storage material may take the form of a coherent body, the form of a plurality or multiplicity of separate segments, the form of a powder bed or powder accumulation or the like.

The activating layer or subregions thereof may optionally subdivide the storage material, disposed in a storage element, into different volume regions separated from one another—for example, into segments, quadrants or the like.

The storage material disposed in a storage element may form a coherent, one-piece accumulation of material, making the storage element particularly simple to produce.

The activating layer of a storage element may form a coherent, one-piece activating layer so its activation and/or deactivation can be actuated particularly simply by an activating device.

The storage material and/or the activating layer may be produced by a 3D printing process. Through such a process it is possible to produce even relatively complex geometries of the storage material accumulations of the storage element and/or of the activating layer of the respective storage element. The storage material and/or the activating layer, however, may optionally also be generated by other production processes.

The activating layer may be disposed within the housing, and the activating layer is consequently protected from external influences, such as mechanical influences, contamination or the like, for example. As a result of this, furthermore, the activating layer is disposed comparatively close to the storage material, which is therefore activatable particularly effectively and without losses in relation to the activation. The housing may further be configured in such a way that it shields the activating layer with respect to the external environment and reduces or prevents an activating medium and/or activating agent released from the activating layer, such as, for example, radiation, by means of which the storage material is activated to release the gas, emerging from the housing in the environment thereof and possibly exerting disruptive influences on other devices.

In various embodiments, the activating layer is in direct contact with the storage material to be activated, more particularly in surface contact. The surface of the activating layer facing the storage material may bear extensively—for example, with 50% or 75% of the superficial extent of the activating layer—or at least substantially over the full area against the storage material. Optionally, however, between the activating layer and the storage material, there may be a layer of a further material or else optionally a cavity disposed, which is pervious in each case to the activating medium/activating agent which is transmitted from the activating layer and which activates the storage material. A layer of material of this kind may mechanically amalgamate, for example, loosely disposed storage material and bring it into the form of a body. In various embodiments, there is no such additional layer of material and/or cavity layer.

The storage material may be a material which chemisorbs and/or physisorbs the gas, and the storage element may consequently have a particularly high storage capacity. The storage material may in particular be a MOF material (metal-organic-framework material) which stores gas, especially hydrogen, with high capacities, i.e., high weight of stored gas in relation to the weight of the storage material in a storage element. Suitable MOF materials are described for example in U.S. Pat. No. 8,426,624, US 2014/0213832 A1 or EP 3 381 924 B1. Suitable storage materials may also constitute boron compounds, such as boranes, more particularly metalloboranes. The MOF material may also be disposed as a coating on a carrier material, as described by Figuerola et al., Applied Materials Today, 16 (2019) 21-27.

In the ready-to-use state of the storage system, the storage material in the storage elements may contain no liquid and/or no solvent, except at most for the gas in the liquefied state to be stored, and more particularly no liquid and/or no solvent which is liquid at 20° C. and at standard pressure of 1013 hPa.

The gas stored may be a gas which is convertible with energy release, such as, in particular, hydrogen and possibly also hydrocarbons, natural gas or the like. The conversion may be an oxidation process, with oxygen as oxidizing agent, for example. This gas may be supplied, for example, to a fuel cell in order to generate power for an electric motor, and possibly also directly to an internal combustion engine, without being limited to this. The storage according to the disclosure is also suitable, however, for the storage and release of other gases, depending on their intended use and on the particular storage material employed.

In various embodiments, the storage material is configured to store the stored gas at least partly or completely in atomically or molecularly fragmented form. This gives the storage system a particularly high operational reliability under a wide range of conditions and scenarios. As a result, furthermore, particularly large amounts of stored gas can be stored per unit volume or unit weight of the storage material and/or with particularly low internal pressure in the storage element when the storage element is fully loaded with the stored gas. In particular the storage material may be configured to store hydrogen at least partly or completely in the form of atomic hydrogen, with the stated advantages thereby arising in a particular way. This also gives the storage system a high storage capacity. As a result of this, furthermore, the storage system is simple to produce and inexpensive to operate, in structural terms and in relation to its mode of operation. Complicated constructions as for the storage of liquefied gas, such as liquefied hydrogen, in high-pressure stores, for example, are avoided, and/or very sharp cooling of the stored gas in the storage system to very low temperatures is not required, and any cooling system that is provided can be designed for relatively low cooling capacities and/or less deep cooling temperatures. The storage system may optionally be cooled down to −50° C. or down to −20° C. or to around 0° C. in long-term operation. In various embodiments, a cooling system is dispensable and not provided for the storage system of the invention.

The activating layer may be configured in such a way that in its activation state it releases the gas stored in the storage material from the storage material, said gas being present in combination with atomically or molecularly fragmented molecules of said gas in the storage element. The activating element or activating layer may constitute a passive element, which in that case, for example, is permanently in its activation state and promotes the release of gas—for example, in the form of a catalyst material which promotes the recombination of gas fragments to form the molecular gas when gas fragments come into contact with the activating material, by diffusion, for example. The activating element may also be an active element which through a switching pulse can be converted alternatively into an activated state or into a nonactivated state.

The activating material in this context may be different from the storage material and have a lower storage capacity than the storage material, as for example 25% or 10% or in at least one embodiment 5% or 1% lower than said material, and optionally virtually no storage capacity. This may relate in each case to 20° C. and at standard pressure of 1013 hPa or at a pressure of 10 bar.

The activating layer may be configured in such a way that on activation it releases an unfragmented gas, physisorbed in or on the storage material, with desorption from the storage material. Generally in the context of the disclosure, the storage material may store a part of the stored gas in atomically or molecularly fragmented form, in which case in the storage state, without removal of gas from the storage element and preferably without activation of the activating layer, the fragmented gas is in chemical equilibrium with molecular—i.e., unfragmented—gas. The molecular gas is assembled in this case by recombination of the fragments. Hence in particular in the storage state, i.e., without activation of the activating layer, the storage material may store atomic hydrogen which is present in equilibrium with molecular hydrogen. The same may also apply, correspondingly, to gases other than hydrogen. In this way, moreover, there is rapid delivery of the gas from the storage element, since the fraction of the gas already present in molecular form can be released on demand from the storage element with virtually no delay. The activation of the activating layer brings about or promotes desorption of the gas, such as of molecular hydrogen, from the storage material. When the gas is taken from the storage element, or released from the storage element, therefore, molecular gas can therefore be generated more rapidly through the activation by means of the activating layer, therefore, on account of the aforesaid chemical equilibrium. The activation of the activating layer may reduce the adsorption capacity of the storage material for the gas and generate a higher gas pressure in the interior of the storage element, thereby enabling an increase in gas release and delivery of gas from the storage element. Alternatively or additionally, the activation of the activating material may promote the recombination of the atomically or molecularly fragmented gas to form gas molecules which can be released from the storage material. As a result, overall, the advantages stated above for the storage system come about in a particular way. The storage system on the one hand enables the particularly advantageous storage of the gas in atomically or molecularly fragmented form and on the other hand enables comparatively rapid release of the stored gas on demand, in the case of increased consumer load, for example.

According to a first variant, the activating layer is or comprises a catalyst material which catalyzes the recombination of atomically or molecularly fragmented gas to form gas molecules. In the case of hydrogen, for example, the catalyst material may comprise nickel or other metals, more particularly transition metals, and/or a precious metal such as platinum, for example. The catalyst material may in particular catalyze the recombination of hydrogen atoms to form molecular hydrogen. On account of a certain mobility of the atomically or molecularly fragmented gas in the storage material, it comes into contact with the catalyst material and so recombines to form the respective gas molecules, which can be released from the storage element when the gas pressure in the storage element is sufficiently low for this purpose or gas is withdrawn.

According to another variant, the material of the activating layer is configured to emit radiation, more particularly electromagnetic radiation, which has a wavelength which brings about desorption of the gas from the storage material and/or recombination of gas fragments to form the gas or to form gas molecules. A particularly preferred variant is that of electromagnetic radiation which brings about desorption of gas molecules from the storage material. The radiation, more particularly electromagnetic radiation, which is irradiated from the activating layer and which leads to or promotes the release of the gas from the storage material may, for example, excite a molecular state of the stored gas and/or an atomic transition of the gas atoms. In terms of wavelength, the electromagnetic radiation may exhibit individual bands or may be continuous radiation. The wavelength of the radiation in various embodiments is ≥1 mm or ≥5 mm or ≥1 cm. In other embodiments, the wavelength of the radiation is ≥5 cm or ≥10 cm, for hydrogen for example around 20 cm. The wavelength may optionally be ≥0.3 mm and ≤10 m. In some embodiments, the wavelength is ≤5 m or ≤2 m, as for example ≤1 m or ≤50 cm. In various embodiments, ≥25% or ≥50%, or ≥75% or substantially 100% of the radiant energy of the emitted radiation has the aforesaid wavelength. The electromagnetic radiation emitted therefore has only a low proportion of thermal radiation, such as ≤50% or ≤25%, ≤10% or ≤5%, preferably ≤1% in relation to the irradiated radiant energy having a wavelength of ≤1 mm. This therefore avoids the emission of thermal radiation which would otherwise lead to heating and therefore to unwanted thermal expansion of the storage material during radiant emission and which could in certain circumstances cause increased promotion of stress cracks in the storage material and/or in other layers of the storage element such as the housing, for example. Optionally, however, thermal radiation, emitted for example in pulse form, may also be used. The radiation emitted corresponds preferably in its wavelength to an absorption band of the stored gas, as for example a hyperfine structural line thereof, and/or else, optionally, of stored gas fragments. The absorption band may correspond in particular to an absorption band of the gas molecule in the state absorbed on the storage material. Alternatively or additionally, the emitted radiation may correspond in its wavelength preferably to an absorption band of the storage material. The term "absorption band" also comprehends a frequency range of the absorbing material that generates a loss factor on passage of radiation through it. In the case of stored hydrogen, in particular, the radiation emitted by the activating layer may have a frequency of around 1420 MHz, corresponding to a wavelength of around 21 cm, which corresponds to the hyperfine structural transition of hydrogen, and which has proven effective for the desorption of molecular hydrogen from the storage material. Materials and devices of this kind that emit electromagnetic radiation, especially microwaves, are general knowledge, including, for example, in the form of diodes such as, for example, Gunn diodes or the like. The material of the activating layer may therefore generally also consist of one or a large multiplicity of components, especially electronic components, which are distributed over the area of the activating layer and which in this case may be disposed at a comparatively low distance from one another, preferably at minimal distance.

The activation for releasing the stored gas may in particular also be accomplished in that the molecular lattice structure of the storage material, through inward radiation of suitable radiation, such as electromagnetic radiation of suitable wavelength, in particular, changes the position of those cavities in the storage material that store the gas molecules, at an atomic and/or molecular level, to form a change in position in relation to an external coordinate system which defines, for example, the position of the storage element. It is known, accordingly, that molecular lattice structures or parts thereof, examples being groups of molecules in the crystal structure, change their position on absorption of radiation in regions, with rotation, and that as a result of this positional alteration, an absorbed gas can be released. Reference may be made, for example, to Wang et al., "Applications of metal-organic frameworks for green energy and environment . . . ", Green Energy & Environment 3 (2018) 191-228.

The activating material may be, for example, a nose catalyst, which in the molecular or crystal structure of the storage material produces a flipping effect, so that gas molecules stored in molecular cavities of the storage material are stimulated to depart the cavity.

Molecular groups of the storage material in the sense of the invention may in particular be in each case organic groups, more particularly organic groups of a MOF material.

According to another preferred variant, the activating layer has a material which emits sound waves, where the sound waves preferably have a wavelength which brings about desorption of the gas from the storage material and/or recombination of gas fragments from the gas to form gas molecules.

Alternatively or additionally, the sound waves may also act on the gas layer surrounding the storage material, as for example on the absorption layer of the gas around the storage material, and may consequently promote the movement of the gas in the direction of the gas outlet of the storage element on withdrawal of gas from the storage element. On withdrawal of gas from the storage element there is a gas flow in the storage element. The sound waves are able to support this gas flow, especially in the case of directed sound waves. The sound waves may also lead to a reduction in the adsorption layer of the gas around the storage material, such as in channels of the storage material, in microscopic channels, for example, so that, as a result of the action of the sound waves, the gas is released more rapidly and/or in larger amount. The adsorption layer may constitute, for example, a boundary layer between the gas phase and the storage material, where on removal of gas from the respective storage element there may be a laminar flow in the gas channels and hence a laminar boundary layer of the gas at the storage material. For this purpose the sound waves may have a suitable wavelength and intensity.

The sound waves may be irradiated as structure-borne sound into the storage material, and/or as airborne sound, or as sound waves which propagate via the atmosphere present in the storage element. In each case it is also possible in particular to use ultrasound, in the 20 kHz to 10 GHz frequency range, for example. The sound may for example have a frequency in the megahertz or gigahertz range, for example in the range from 1 MHz to 10 GHz, without being restricted thereto, as for example around 1 GHz to 10 GHz, more particularly in the region of 1420 MHz. For applications wherein the sound is intended to promote the gas flow, absorption layers of the gas on the storage material or molecular movement of the desorbed gas in a transport direction toward the gas outlet, it is also possible optionally to use relatively low sound frequencies. Sound wave emitters used may be, for example, piezoelectric elements or other electromechanical elements which emit sound waves on exposure to current, voltage or other physical variables. The sound wave emitter, the piezoelectric element for example, may have been produced for example by 3D printing.

In particular, two or more of the abovementioned activating layers having different activation mechanisms for releasing the gas may be used in combination with one another—for example, activation by means of electromagnetic radiation in combination with a catalyst material, and/or activation by means of sound waves, or, according to another variant, for example, activation by means of sound waves in combination with a catalyst material.

With particular preference the activating layer of the respective storage element is in signal-transmitting communication with a controller, where the controller activates or deactivates the activating layers alternatively on demand. Through actuation of the activating layer by means of the controller, therefore, it is possible on a demand basis to increase the stored gas and/or limit the release. This is the case in particular for radiation-emitting activating layers, more particularly layers that emit electromagnetic radiation and/or sound waves.

The controller for the activating layer may be in signal-transmitting communication with the controller of the consumer or may be part thereof, so that, in the case of increased demand by the consumer, the activating layer of the respective storage element is activated, and/or, in the case of reduced demand for released gas on the part of the consumer, the activating layer is less strongly activated or is deactivated. For actuating the activating layer, the controller may send a control impulse to it, more particularly an electrical and/or optical control impulse. The activating layer is actuatable preferably stepwise or steplessly or is actuated stepwise or steplessly by means of the controller. The degree of activation of the activating layer can be adjusted in this way, with the degree of activation of the activating layer preferably correlating, preferably at least substantially proportionally, with the amount of stored gas released from the storage material. This is the case, for example, with the storage element completely loaded with gas.

The activating layer may optionally be connected to an energy source which activates the activating layer to emit the activating radiation such as electromagnetic radiation and/or sound waves, for example. For certain operating states of the storage elements and/or of the consumer, the energy source may also be the fuel cell in the form of the consumer, in which case preferably, in the consumption of the gas released from the storage elements, more energy is generated than is consumed by the activating layer.

The respective storage element preferably has a valve device on the gas inlet side and/or gas outlet side, in order to be able to open and/or close the storage element at least partly or completely on demand and so as to be able to control the release of stored gas. The actuation of the valve device may be in signal-transmitting communication with the controller of the consumer such as a fuel cell, for example. On increased demand by the consumer, therefore, the storage element can release the gas to an increased extent, and/or, on lower demand, the storage element may release the gas to a reduced extent by at least partly closing the valve device. The valve device may be configured more particularly in the form of a membrane valve. A membrane of this kind may consist for example of polymers, silicones, may have at least one ceramic blocking layer, or the like. The valve device may be a passive device, which only opens as a result of a pressure exceeding a threshold value and which closes when the pressure falls below the threshold value. The valve device may also be amenable to active actuation and may be operable, for example, by an actuator such as a piezoelectric element, shape memory alloy or the like. The valve controller may be part of the controller of the consumer. The valve is preferably actuatable in such a way as to be transferred into its open position, into its closed position and/or into a partly opened position in between, preferably steplessly or else stepwise.

Alternatively or additionally, a corresponding valve device—as described above—may also be disposed at a region of the line sections which connect the storage elements to the consumer. This valve device may be provided, for example, on a collecting line of the line system, i.e., for example, directly at the consumer.

Generally in the context of the invention it is appreciated that the gas inlet and the gas outlet of the respective storage element may also be identical to one another and differ only in the different flow direction of the gas into the storage element or out of the storage element, respectively. The respective storage element can be filled with the gas to be stored through the gas inlet. Preferably, in general, gas inlet and gas outlet of the storage element are provided by the same passage opening of the storage element for the gas.

The respective storage element preferably has a pressure-stable housing composed of a first material, which is provided on the inside with a gastight membrane, preferably in the form of a membrane layer, composed of a second material. The respective line to and from the storage element for the gas preferably consists in each case of the first material and is preferably connected in one piece to the storage element. The lines to and from the respective storage element may be provided by the same line section, with only the flow direction of the gas being different. The respective line to the storage element is preferably provided on the inside with a gastight membrane composed of the second material, which is connected preferably in one piece and gastightly to the gastight membrane of the storage element. Said membrane preferably surrounds the storage material or activating layer and storage material over the entire surface thereof, except for the gas inlet/outlet. As a result of the configuration of the storage element and preferably of the line to it from a first material for the housing and from a second gastight material in the interior of the housing, housing and/or incoming lines may be configured in a particularly advantageous way in relation to the mechanical stability and also the gastightness. Hence the housing may consist of a particularly pressure-resistant and mechanically stable material, and on the other hand the membrane may be particularly gastight, to a degree higher than the gastightness of the housing. As a result, the storage element may meet particularly demanding requirements, also in relation, in particular, to external mechanical exposures. The storage element as a result has a particular configuration for being used even in close vicinity to an area where persons reside. In particular the storage system is adapted as a result to be used in motor vehicles as well, where the security requirements to be met are particularly stringent. The housing may consist, for example, of a material containing reinforcing fibers such as carbon fibers, for example. The membrane may have a high diffusion resistance in relation to the respective gas, more particularly hydrogen, being made, for example, of a suitable plastics material, a metal alloy, a ceramic material or the like.

The housing is configured preferably in the form of a shrink-on shell structure, allowing the housing to be shrunk onto the rest of the constituents of the storage element, such as activating layer and/or storage material, preferably also onto the membrane layer surrounding the activating layer. This gives the housing a particularly compact configuration and, as a result of the shrinking procedure, even a mechanically less stable storage material can be compressed and stabilized, even in the context of external mechanical forces acting on the storage element.

The membrane may lie over the full area directly against the inside housing wall. Optionally there may also be a space between the membrane and the inside of the housing; preferably there is no such space. The membrane may generally be connected superficially, preferably over the full area, to the inside of the housing, by means, for example, of adhesive bonding, welding, pressing at relatively high temperatures or the like, or by shrink-fitting of the housing onto the membrane layer.

The membrane may lie superficially, preferably over the whole area, against the outside of the activating layer.

Optionally there may also be a certain clearance between the activating layer and the membrane, in the form, for example, of a channel structure which surrounds the storage material—with particular preference, channel sections extending in different directions and in fluid-pervious communication with one another.

The storage system more preferably has a multiplicity of storage elements, with gas inlets/outlets which are connected to one another via a gas-conducting line system. The multiplicity of storage elements enables an increase in the storage capacity of the system for the gas to be stored/released. Moreover, the disposition of a multiplicity of storage elements, connected to one another via the gas-conducting line system to form an overall store, enables the spatial disposition of the storage system to be adapted to the particular prevailing spatial and constructional configurations of the apparatus supplied by the system. The apparatus generally may preferably constitute a motor vehicle. In this case the storage system may be integrated within the apparatus or motor vehicle. The configuration of the storage system in accordance with the invention makes it possible to integrate such a storage system in an apparatus which was equipped, for example, with a conventional propulsion device such as, for example, an internal combustion engine, more particularly a gasoline or diesel engine, with relatively minor changes or substantially no changes to the construction of the apparatus or motor vehicle. The phrase "overall storage system" is a reference here to the fact that the system is connected or may be connected by a mandated connection to the respective consumer, a fuel cell for example, or optionally directly to a power generating machine which utilizes the stored gas thermally or chemically.

The object is further achieved by a storage system according to claim 17, which may be developed according to claim 18. Reference is otherwise made to the rest of the observations regarding the storage system of the invention.

With particular preference the line system has a multiplicity of line sections which are disposed in the form of a tree structure and are in fluid-conducting communication with one another. Located preferably on the end portion of a respective line section is a storage element of the invention, which is in fluid-conducting and gastight communication with the respective line section. The tree structure has a multiplicity of line branches. The tree structure preferably has a multiplicity of line branches in the manner of a hierarchy system, where a first hierarchy comprises a number of X line sections A, with each end of the line sections A being connected via a multiple branching to Y line sections B, and where optionally there may also be a corresponding plurality of further levels of hierarchy provided. X and Y here each preferably represent integers $\geq 2$, as for example $\geq 3$ or $\geq 4$ or $\geq 8$. Through this tree structure with a multiplicity of line sections, accordingly, the storage system may comprise a multiplicity of storage elements so as to raise the storage capacity of the system for the gas. Furthermore, the spatial arrangement of the storage system with the multiplicity of line sections and storage elements can take on diverse configurations and is not confined, for example, to particular spatial geometries, like a one- or two-part gas tank. The storage elements and line section of a single storage system here may be arranged, for example, extensively or expansively in an apparatus such as a motor vehicle, for example, in which the storage system is integrated. The storage system may in this case easily be adapted to different apparatuses, specifically by simple positional alteration of the line sections, without changing the constructional configuration of the storage system. As a result, the storage system can be integrated, for example, into existing cavities in the apparatus that otherwise have no other usage function. The mechanically stable and gastight design of the respective storage element enables a given storage system to have a particularly flexible arrangement in spatial terms, without the need, for example, as in the case of a one-part or two-part gas tank, to produce the gas tank housing in different shapes, using different shaping tools, in order to adapt it necessarily to differing spatial arrangements. In the case of the storage system of the invention with a multiplicity of storage elements, the individual storage elements may each be constructed identically, so making their production and the production of the storage system substantially easier overall. Thus, for the storage system of the invention, for example, different storage elements can be arranged in different regions of the apparatus or of a motor vehicle, such as in the floor region, in the vehicle side region such as in the region of the fenders or the like, and the multiplicity of storage elements of the storage system are connected or can be connected to the consumer, such as a fuel cell, for example, in a gas-transferring manner by means of one or precisely one common incoming/outgoing line.

The gas pressure in the system on storage and/or release of the gas, more particularly for maximum storage of the releasable gas, is preferably $\leq 20$ bar, more preferably $\leq 10$ bar or $\leq 5$ bar, more preferably $\leq 2$ bar. This gas pressure may in each case also be present when the system is releasing the maximum amount of stored gas per mandated unit time. This pressure may in each case also be the maximum operating pressure of the system. The storage system overall may therefore be designed for operation for comparatively low gas pressure or operated at low gas pressure. This has the particular advantage that the housing of the respective storage element need not be designed for high operating pressures and can therefore have a particularly simple construction. This is a particular advantage over storage systems in which the gas, hydrogen for example, is operated at high pressures. The configuration of the system in accordance with the invention makes it possible at the same time to release a comparatively large amount of gas within a mandated unit time.

The storage system is preferably designed to store $\geq 500$ g of the respective gas, more particularly hydrogen, as for example $\geq 1000$ g or $\geq 3000$ g, more preferably $\geq 5000$ g. This ensures a long operating time of the apparatus with consumption of the stored gas—for example, a comparatively long distance of travel for a motor vehicle for a single maximum filling of the storage system with the respective gas.

With particular preference the respective storage element is designed to store $\leq 10$ g of the respective gas, more particularly hydrogen, more preferably $\leq 5$ g or $\leq 2$ g, as for example 1 g or less. As a result, the respective storage element can have a particularly low construction volume, whereas the system as a whole can nevertheless have a high storage capacity for the respective gas, through disposition of a corresponding multiplicity of storage elements in the system. As a result, on the one hand, the storage system has particularly high operational reliability. On the other hand, this allows the storage element to be made in a particularly constructionally simple way which is particularly economical with material. A particular advantage, moreover, is that the storage element can be given a relatively small volume, allowing it to be arranged in a simple way into existing cavities of the apparatus—a motor vehicle, for example—which are otherwise unutilized. In an existing apparatus, a storage system of the invention can in this case be integrated particularly easily. As a result, furthermore, at least substantially the entire volume of the storage material of the storage element can be activated particularly simply and reliably by the activating element or activating layer.

The incoming/outgoing lines of different storage elements in the storage system to/from the consumer preferably have different lengths. As a result, the storage system can be adapted in its geometry, in relation to the spatial arrangement of the storage elements relative to one another, to the structure of a given apparatus on which the storage system is integrated, in a particularly flexible way. The storage system in this case may extend over a space or an area with different distances of individual storage elements to the consumer, with a comparatively small overall length of the incoming/outgoing lines of the total number of storage elements to the consumer. This gives the storage system a particularly advantageous design, allowing it to be integrated into an existing spatial structure of an apparatus, preferably without having to change the spatial structure of the apparatus.

The storage system may therefore comprise a large multiplicity of storage elements, connected via a gas-conducting line system to a connection, more precisely exactly one connection, where the connection is connected or connectable to a consumer for the stored gas. The storage system may comprise for example ≥50 or ≥100, preferably ≥250 or ≥500, storage elements, including for example ≥1000 or ≥5000. The arrangement of the storage elements in this case may be positionally modifiable relative to one another, said elements being arranged individually or in groups, as for example in groups of ≥10 or ≥50 or ≥100 or ≥500 or ≥1000 storage elements, in order to be able to be adapted in terms of their position to the spatial structure of the apparatus when the storage system is integrated into the apparatus.

The storage system may be designed to allow a motor vehicle to operate over a distance of ≥50 km or ≥100 km, more particularly ≥250 km or ≥500 km.

It will be appreciated that, generally, the apparatus or consumer thereof may be connected to multiple storage systems of the invention.

The object is further achieved through provision of a motor vehicle or consumer with a storage system of the invention. As is the case generally in the context of the invention, the consumer may more particularly represent a fuel cell. The fuel cell may be integrated in a motor vehicle, in which case the consumer may be in energy-transmitting communication with a motor propulsion device for the locomotion of the motor vehicle, such as, in particular, an electric motor. The gas stored in the storage system therefore enables the fuel cell to be operated to generate power, with the power generated being supplied to a propulsion machine such as an electric motor for the locomotion of the motor vehicle. It has emerged that in construction terms the storage system of the invention can be integrated particularly simply in a motor vehicle, because the spatial arrangement of the storage elements of a storage system relative to one another can be adapted particularly simply to the vehicle geometry and arrangement, and also the design of cavities already existing in the motor vehicle, without altering the construction of the motor vehicle, or can be performed at least with relatively minor alterations.

The storage elements of a or precisely one storage system of the invention are preferably disposed in different cavities of the vehicle. Different vehicle cavities are in this case each surrounded preferably by at least one different vehicle component, forming the respective cavity of the vehicle, with the respective component preferably comprising at least partly in each case a group of storage elements on the outside. Reference may be made to the group of storage elements described above. The various cavities of the vehicle each accommodating a group of storage elements are preferably formed in each case by different vehicle components. As a result it is possible to be able to connect a storage system to a consumer with a, specifically precisely one, connection, or the storage system is connected accordingly. For example, one group of storage elements of a given storage system may be disposed in the underbody region of a specified vehicle, and another group of storage elements of the same storage system in the vehicle may be disposed between side parts of the vehicle such as, for example, behind a fender. Because the dimensionally stable housing of the individual storage elements means that they are already adequately protected from external mechanical exposures, there is no need to provide a further mechanical, high-stability encapsulation for the storage material.

The motor vehicle preferably has, for its propulsion, a propulsion device which is operated or can be operated with the gas stored in the storage system as the propulsion medium. A propulsion device of this kind may more particularly be a fuel cell in combination with an electric motor. The propulsion device in this case may have a controller which is designed to actuate the activating layers of the storage elements for increased release of the gas from the storage material on demand, in the case of an increasing vehicle speed, for example, and/or to reduce the activation state of the activating layers on demand, in order to bring about reduced release of the gas from the storage material, as in the case, for example, of a desired reduction in the vehicle speed. As a result, the gas pressure in the storage elements can be adapted to the particular requirements, and an excessive gas pressure in the storage elements, if the consumption of released gas is to be reduced, for example, can be avoided.

The invention is described below with reference to an exemplary embodiment. All of the features of the exemplary embodiment are valid independently of one another or in combination with one another generally in the context of the invention, and it will be appreciated that the embodiments of the exemplary embodiment are also valid only for a single storage element of the invention. It will additionally be appreciated that the observations made regarding the storage element/elements of the exemplary embodiment may also be valid for all of the storage elements in the storage system.

In the figures:

DETAILED DESCRIPTION

As required, detailed embodiments of the present invention are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1A:
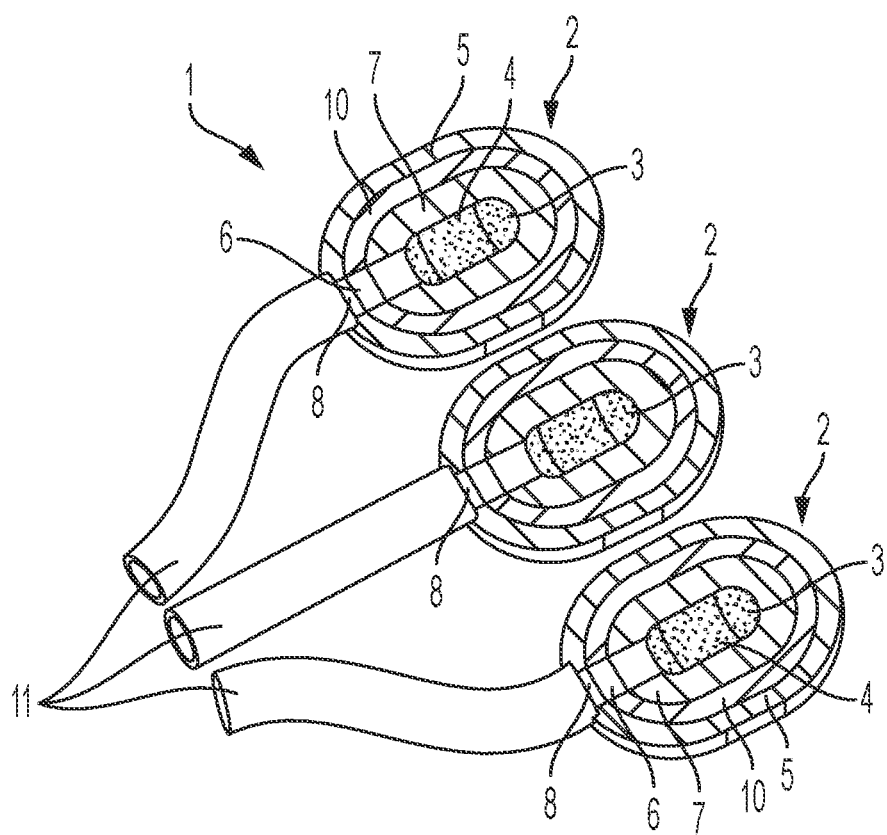
FIG. 1A shows an arrangement of three storage elements in partial elevation according to a first variant.
Figure 1B:
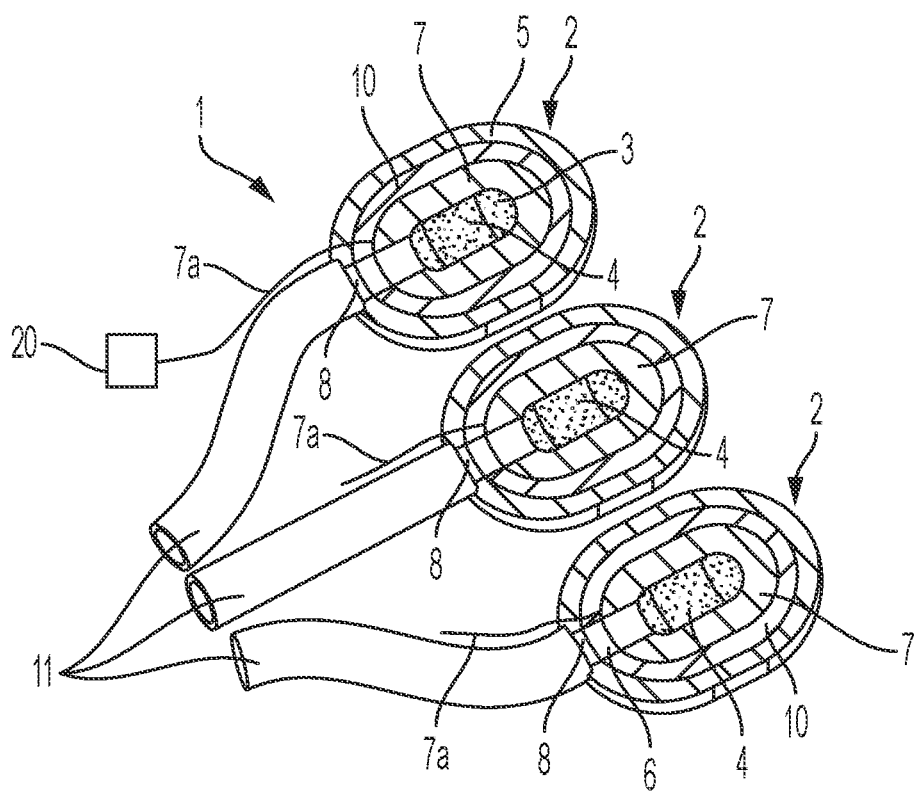
FIG. 1B shows an arrangement of three storage elements in partial elevation according to a second variant.
Figure 2:
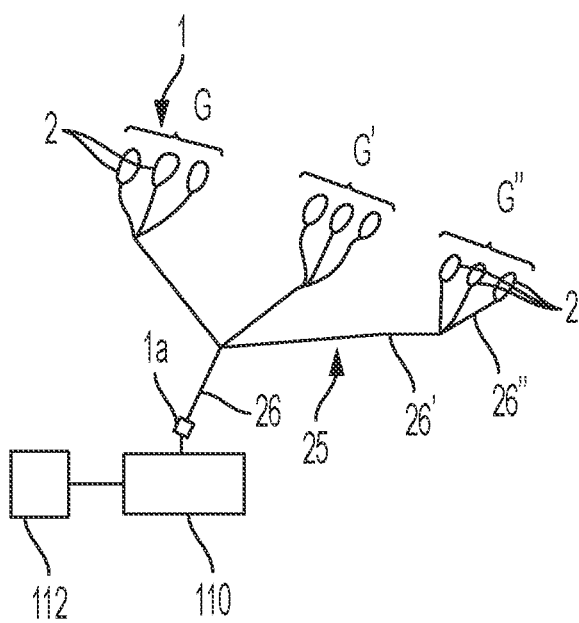
FIG. 2 shows a schematic representation of a storage system with a multiplicity of storage elements as in FIGS. 1A and 1B.
Figure 3:
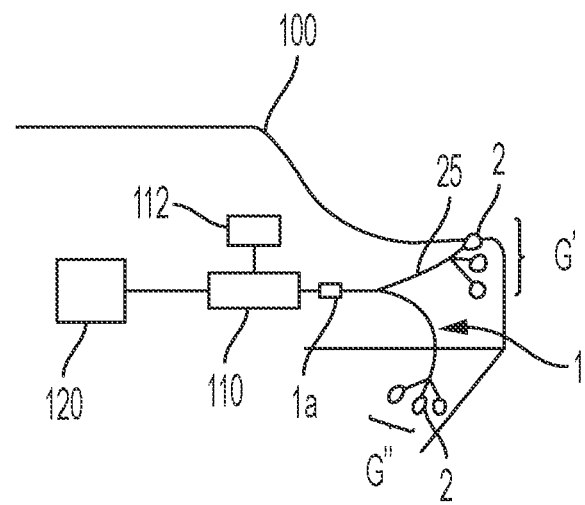
FIG. 3 shows a schematic representation of a vehicle or subregion of a vehicle with a storage system according to one or more embodiments, with storage elements according to FIGS. 1A and 1B and/or FIG. 2.

FIGS. 1A and 1B shows a subregion of a storage system 1 of one embodiment for reversibly storing and releasing gases, more particularly hydrogen. The storage system 1 is shown here as a detail with three storage elements 2, with a respective section of an incoming/outgoing line 11 for each storage element 2. It will be appreciated that the following observations may also be valid only for a single storage element 2 or else for multiple storage elements or all the storage elements of a group of storage elements, or for all of the storage elements of the storage system 1. The storage system is described here in relation to storage of hydrogen, although it will be appreciated that this may also be valid correspondingly for other gases.

The respective storage element 2 comprises a storage volume 3 with a storage material 4 for reversibly storing the gas, presently hydrogen, and comprises a gastight housing 5 which surrounds the storage volume and has a gas inlet/outlet 6, which is in fluid-conducting communication with the storage volume 3. By way of the gas inlet/outlet 6 and the incoming/outgoing line 11, the storage volume can be filled with the gas for storage or, via the gas inlet/outlet 6 and the incoming/outgoing line 11, the stored gas can be released from the storage element and supplied to a consumer 110 for consumption. The connection 1a of the storage system can be connected to a gas source such as a hydrogen filling station, for example, for reversible filling of the system.

The storage element 2 has at least one activating element 7, here in the form of an activating layer. The activating element may alternatively be designed in another suitable way, as for example in the form of multiple or a multiplicity of separate activating elements—local or in point form, for example—which can be arranged in a distributed manner around and/or in the storage volume. The activating element 7 comprises a nonfluid activating material, which in this case is present in solid form at 20° C. and standard pressure (1013 hPa). The design of the activating element is such that when it is activated, the storage material 4 releases the gas stored in it, or releases it to an increased extent, in relation to a storage element of otherwise identical construction but without an activating element. The activating element 7, in this case the activating layer, surrounds and/or penetrates the storage material 4. The activating layer may penetrate the storage material in layer form, for example, and subdivide it into different segments, such as into segments with a quadrant-shaped layout, for example. The activating element here is embodied at least substantially in a dimensionally stable form.

The activating layer here surrounds the storage material in the form of a shell, specifically, except for the gas inlet/outlet 6, over the entire surface area of the storage volume or storage material accumulation. The storage material is designed here as a coherent body, but may also take the form of a multipartite body, particle bed or the like. The activating element or activating layer with the activating material is disposed within the housing 5. The activating layer 7 or the activating material is in direct contact, more particularly superficial contact, in this case in full-area contact, with the storage material.

The storage material 4 is a material which physisorbs and/or chemisorbs the gas, more particularly hydrogen, and here specifically is a MOF material. The storage material 4 stores the stored gas at least partly in atomically or molecularly fragmented form. In this case, when no gas is being withdrawn from the storage element, the stored gas is in an equilibrium on the one hand in molecular form, in which the gas can be released from the storage element to the consumer, and on the other hand is partly in atomically or molecularly fragmented form in the storage material. Hydrogen stored by the storage element, therefore, is in equilibrium on the one hand as $H_2$ gas and on the other hand as atomic hydrogen. It is, however, also possible for the entire stored gas in the storage element to be present molecularly, in unfragmented form, and to be physisorbed, for example, on the storage material. The design of the activating element 7 or activating layer here is such that said element or said layer, when activated, releases from the storage material the gas that is stored in the storage material and is present in the storage element in combination with atomically or molecularly fragmented molecules of said gas. Generally, therefore, when activated, the activating element promotes the release or desorption of the unfragmented, molecular gas stored in the storage material, such as molecular hydrogen, for example.

According to FIG. 1A, the activating element 7 is designed as a passive element, which is therefore permanently in its activation state and cannot be transferred alternately into an activation state or deactivation state by an activating impulse such as an electrical and/or optical impulse, for example. For this purpose, the activating element comprises or consists of a catalyst material which catalyzes the recombination of atomically or molecularly fragmented gas to form gas molecules—in other words, presently, the recombination of atomic hydrogen to form molecular hydrogen. On withdrawal of gas from the storage element, therefore, molecular gas can be delivered very rapidly from the stored fragmented gas. Here, as an example, the catalyst material is catalytically active nickel.

According to FIG. 1B, the activating element 7 or activating layer is designed as an active element, which therefore can be transferred alternately into an activation state or deactivation state by an activating impulse such as an electrical and/or optical impulse, for example. For this purpose, the activating element 7 is connected to a supply line 7a, which transmits a switching impulse to the activating element. The switching impulse may in particular also comprise the energy which is emitted from the activating element to the storage material, in the form of radiation, for example, in order to activate the storage material for the release of the gas. In particular, therefore, the supply line may be an electrical and/or optical supply line, to transmit electrical power or electromagnetic waves to the activating element, in order to supply and/or to switch said element for activation.

According to a first variant, the activating material of the activating element is a material which on activation emits electromagnetic radiation, with the electromagnetic radiation emitted having a wavelength which brings about desorption of the gas from the storage material and/or recombination of gas fragments to form the gas molecules. The activating element may, specifically, emit electromagnetic radiation having a frequency of around 1420 MHz, corresponding to a wavelength of around 21 cm, to the storage material, in order to promote the release of molecular hydrogen.

According to one modification, the electromagnetic radiation emitted by the activating element 7 may also stimulate movements of the storage material 4 at a molecular level— for example, certain rotational oscillations or vibrations of molecular groups of the storage material, which promotes release of gas from the cavities in the storage material. These cavities may be molecular cavities as in the case, for example, of MOF materials. This stimulation of the storage material at a molecular level may bring about, for example, a flipping effect, which stimulates one or more gas molecules stored in the cavity to depart the cavity and therefore at least indirectly to depart the storage material.

According to a second variant, the activating material of the activating element 7 is a material which on activation emits sound waves, with the sound waves having a wavelength which brings about desorption of the gas from the storage material and/or recombination of gas fragments to form the gas to form gas molecules. The sound waves may be transmitted directly, as structure-borne sound, for example, to the storage material. The sound waves may optionally also be irradiated in the form of airborne sound onto the boundary layer of the stored gas with the storage material and/or into the gas volume of the stored gas in the storage volume. As a result, desorption of gas molecules from the storage material is promoted. The sound waves may also generally have the effect that stored gas already released from the storage material departs the storage element more quickly through the gas outlet.

The activating element 7 or the activating layer of the storage element, especially when the activating element 7 is actively operable, is in signal-transmitting communication with a controller 20, with the controller 20 activating or deactivating the activating element 7 or the activating layer thereof on demand. The controller 20 is in this case part of a controller 112 for the consumer 110. The controller 20 may in particular activate the activating element when the consumer—such as a fuel cell, for example—requires more gas to be able to operate the apparatus 100 comprising the consumer 110, said apparatus being embodied here in the form of a motor vehicle, at higher load, for example.

On the gas inlet/outlet side, the respective storage element has a valve device 8, allowing the storage element to be at least partly or completely opened and/or closed on demand. According to one variant, the valve 8 is a membrane, which releases gas from the storage element when a threshold pressure is exceeded; according to another variant, the valve 8 is a valve which can be actuated actively by means of a controller, such as the controller 20, for example.

The respective storage element has a pressure-stable housing 5 composed of a first material, which is provided on the inside with a gastight membrane 10 composed of a second material. The housing is designed as a shrink element, which can be shrink-fitted onto the activating layer or the storage material. The membrane 10 surrounds the activating layer 7 on the outside and lies against it over the full area. The membrane lies against the inside of the housing over the full area. The housing 5 may also be shrink-fitted onto the membrane surrounding the activating layer. The membrane 10 also extends in a gastight manner right through via the gas inlet/outlet into the incoming/outgoing line. The membrane 10 here likewise constitutes an inner lining of the line 11.

The storage system 1 here has a large multiplicity of storage elements 2, in the present case more than 5000 elements. The storage elements here are of identical construction. The gas inlets/outlets 11 of the storage elements 2 are connected to one another, to form a coherent gas store, via a gas-conducting line system 25 which comprises the incoming/outgoing lines 11. The storage system therefore has a connection 1*a* for connection to the consumer 110. The storage system is designed for reversible storage of around 5000 grams of the gas, more particularly hydrogen. The respective storage element is able to store around 1 gram of the gas, more particularly hydrogen, or else only 0.5 gram. The gas pressure in the system in the case of the storage and/or release of the gas is 20 bar, as for example around 5 bar.

The line system 25 has a multiplicity of line sections 26, which are arranged in the form of a tree structure and in fluid-conducting communication with one another. The tree structure has a plurality of levels of hierarchy, with line sections 26' having branches and each line section 26' transitioning into a plurality of line sections 26" of the next level of hierarchy, and so on. As a result, the storage system can comprise a multiplicity of storage elements, which from the one connection 1*a* are supplied with gas for storage or are able to release stored gas reversibly to the consumer. Presently there are different line sections 25 with different lengths, in order to allow the storage system to be easily adapted to the geometry and/or cavity structure of the apparatus. The tree structure is constructed here in the form of a fractal system. Storage elements 2 which are in fluid-conducting communication on a line section 26" with branching, optionally by way of further branches and line sections, here form a group G of storage elements. The storage elements 2 of the system 1 are presently all of the same construction as one another, although it is also possible to provide different types of storage elements, with different housing shape and/or storage volume, for example.

The apparatus 100 is designed here as a motor vehicle. The consumer 110 is designed as a fuel cell, which provides the operational energy for an electric motor for the propulsion of the vehicle.

The storage system 1 extends with its storage elements 2 in different cavities of the vehicle. Different groups G of storage elements are arranged here in different vehicle cavities. The different vehicle cavities are arranged here separately from one another, being therefore surrounded by different vehicle parts. One part of one and the same storage system with group G' is arranged here in the floor region 100*a* of the vehicle, while another part of the same storage system with group G" is arranged between fender 100*b* and trunk wall. The storage system 1 may be arranged on the vehicle using existing cavities of a vehicle, which has otherwise been operated with a combustion engine such as a gasoline or diesel engine, without reconstruction of the vehicle.

The vehicle 100 here, therefore, has a propulsion device 120 for propelling the vehicle, taking the form here of a fuel cell and of an electric motor supplied with power from said cell, and is operated or is operable with the gas stored in the storage system as the propulsion medium. A controller 112 of the propulsion device is designed in order to actuate the activating layers of the storage elements for increased or reduced release of the gas from the storage material on demand. "Reduced" release means here that the activating layer is unactivated or activated only to a slight extent.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that are not explicitly illustrated or described in combination.

What is claimed is:

1. A storage system for reversibly storing and releasing a gas, the storage system including a plurality of storage elements, each storage element comprising:
   a storage volume with a storage material for reversibly storing the gas;
   a gastight housing surrounding the storage volume and including a gas inlet/outlet which is in fluid communication with the storage volume;
   at least one non-fluid activating element configured such that, when in an activation state, the storage element releases the stored gas to an increased extent in relation to an unactivated state, wherein the activating element surrounds or penetrates the storage material.

2. The storage system according to claim 1, wherein the activating element comprises an activating layer that surrounds the storage material.

3. The storage system according to claim 1 wherein the activating element is disposed within the housing.

4. The storage system according to claim 1, wherein the storage material is a metal-organic framework (MOF) material configured to chemisorb and/or physisorb the gas.

5. The storage system according to claim 1, wherein the storage material stores the gas at least partly in atomically or molecularly fragmented form.

6. The storage system according to claim 1, wherein the gas is hydrogen and wherein the storage material stores the hydrogen at least partly in atomic form.

7. The storage system according to claim 1, wherein the activating element is configured such that on activation thereof the activating element releases the gas stored in the storage material from the storage material, said gas being present in combination with atomically or molecularly fragmented molecules of said gas in the storage element.

8. The storage system according to claim 1, wherein the activating element includes activating material selected from at least one of:
   a) a catalyst that catalyzes recombination of atomically or molecularly fragmented gas to form gas molecules;
   b) a material which on activation emits electromagnetic radiation, where the emitted electromagnetic radiation has a wavelength which brings about desorption of the gas from the storage material and/or recombination of gas fragments to form gas molecules; and
   c) a material which on activation emits sound waves, where the sound waves have a wavelength which brings about desorption of the gas from the storage material and/or recombination of gas fragments to form gas molecules.

9. The storage system according to claim 1, wherein each activating element is in communication with a controller, where the controller activates or deactivates the activating element in response to demand for the stored gas.

10. The storage system according to claim 1, wherein each storage element has a valve coupled to the gas inlet/outlet.

11. The storage system according to claim 1, wherein the gastight housing comprises a pressure-stable housing composed of a first material, and a gastight membrane provided inside the gastight housing, the gastight membrane composed of a second material.

12. The storage system according to claim 1, wherein the plurality of storage elements include respective gas inlets/outlets in communication with one another.

13. The storage system according to claim 12, wherein the gas inlets/outlets are connected to a gas distribution system having a multiplicity of line sections configured as a tree structure and are in fluid communication with one another.

14. The storage system according to claim 1, wherein gas pressure in the system on storage and/or release of the gas is less than 20 bar.

15. The storage system according to claim 1, wherein the storage system is configured for storage of 500 grams of hydrogen.

16. The storage system of claim 1, wherein each of the plurality of storage elements is configured to store 10 grams of hydrogen gas.

17. A storage system for reversibly storing and releasing hydrogen gas, comprising:
   a plurality of storage elements each having a storage volume with a metal-organic framework (MOF) storage material for adsorbing or physiosorbing the hydrogen gas within a gastight housing surrounding the storage volume and having a gas inlet/outlet which is in fluid-conducting communication with the storage volume; and
   a nonfluid activating material contained within the gastight housing and having an activated state that releases the hydrogen gas stored in the storage material.

18. The system according to claim 17 wherein the non-fluid activating material comprises an activating layer surrounding the storage material.

19. A motor vehicle comprising the storage system according to claim 18.

20. The motor vehicle according to claim 19, wherein at least two of the plurality of storage elements are disposed in different cavities of the vehicle.

* * * * *